United States Patent
Tang et al.

(10) Patent No.: US 8,774,639 B2
(45) Date of Patent: Jul. 8, 2014

(54) ULTRA HIGH DENSITY PIN-COMPATIBLE FOUR-CHANNEL ENHANCED SMALL FORM-FACTOR PLUGGABLE MODULE

(75) Inventors: Norman Tang, Los Altos, CA (US);
Liang Ping Peng, Santa Clara, CA (US);
David Lai, Mountain View, CA (US);
Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 13/418,521

(22) Filed: Mar. 13, 2012

(65) Prior Publication Data

US 2013/0243438 A1    Sep. 19, 2013

(51) Int. Cl.
*H04B 10/00* (2013.01)

(52) U.S. Cl.
USPC ............ 398/138; 398/139; 398/182; 398/202

(58) Field of Classification Search
USPC .................................. 398/135–139
See application file for complete search history.

(56) References Cited

U.S. PATENT DOCUMENTS

| | | | |
|---|---|---|---|
| 7,044,656 B1 * | 5/2006 | Hofmeister et al. ............ 385/89 |
| 7,371,014 B2 * | 5/2008 | Willis et al. ..................... 385/89 |
| 7,941,053 B2 * | 5/2011 | Dallesasse .................... 398/139 |
| 8,075,199 B2 | 12/2011 | Losio et al. |
| 8,078,053 B1 | 12/2011 | Mazzini et al. |
| 8,200,097 B2 * | 6/2012 | Cole .............................. 398/153 |
| 8,340,123 B2 * | 12/2012 | Barbieri et al. ............... 370/466 |
| 8,433,202 B2 * | 4/2013 | Way .............................. 398/158 |
| 8,494,363 B2 * | 7/2013 | Calderon et al. ................ 398/43 |
| 2008/0095541 A1 * | 4/2008 | Dallesasse .................... 398/191 |
| 2009/0257754 A1 | 10/2009 | Theodoras, II et al. |
| 2010/0296559 A1 * | 11/2010 | Barbieri et al. ............... 375/222 |
| 2012/0201535 A1 * | 8/2012 | Loprieno et al. ................ 398/45 |
| 2012/0230700 A1 * | 9/2012 | Cafiero et al. ................ 398/138 |
| 2012/0269511 A1 * | 10/2012 | Calderon et al. ............... 398/58 |
| 2013/0136446 A1 * | 5/2013 | Hotchkiss et al. .............. 398/22 |
| 2013/0177309 A1 * | 7/2013 | El-Ahmadi et al. ............ 398/25 |
| 2013/0243438 A1 * | 9/2013 | Tang et al. .................... 398/135 |

* cited by examiner

*Primary Examiner* — Agustin Bello
(74) *Attorney, Agent, or Firm* — Edell, Shapiro & Finnan, LLC

(57) ABSTRACT

An enhanced small form-factor pluggable (SFP+) transceiver module and an SFP+ host port are provided. The enhanced SFP+ transceiver module receives a reception data signal at a data rate of 40 gigabits per second (40G). The reception data signal is sent to a transceiver bidirectional transmission unit. The transceiver bidirectional transmission unit comprises a first SFP+ connector unit configured to interface with a second SFP+ connector unit of an SFP+ host port. The reception data signal is sent from the transceiver bidirectional transmission unit to the second SFP+ connector unit of the SFP+ host port via the first SFP+ connector unit.

15 Claims, 8 Drawing Sheets

| | CONVENTIONAL TRANSCEIVER SFP+ CONNECTOR UNIT ~108 | MODIFIED HOST SFP+ CONNECTOR UNIT ~110 | MODIFIED TRANSCEIVER SFP+ CONNECTOR UNIT ~116 |
|---|---|---|---|
| 1 | VeeT | GND | GND |
| 2 | TX Fault | TX Fault/IntL | IntL |
| 3 | TX Disable | TX_Disable/LPmode | LPMode |
| 4 | SDA | SDA | SDA |
| 5 | SCL | SCL | SCL |
| 6 | MOD_ABS | Mod_ABS | Mod_ABS |
| 7 | RS0 | GND | GND |
| 8 | LOS | BD4+ | BD4+ |
| 9 | RS1 | BD4- | BD4- |
| 10 | VeeR | GND | GND |
| 11 | VeeR | GND | GND |
| 12 | RD- | BD3- | BD3- |
| 13 | RD+ | BD3+ | BD3+ |
| 14 | VeeR | GND | GND |
| 15 | VccR | VccR/BD2- | VccR/BD2- |
| 16 | VccT | VccT/BD2+ | VccT/BD2+ |
| 17 | VeeT | GND | GND |
| 18 | TD+ | BD1+ | BD1+ |
| 19 | TD- | BD1- | BD1- |
| 20 | VeeT | GND | GND |

ULTRA HIGH DENSITY PIN-COMPATIBLE FOUR-CHANNEL ENHANCED SMALL FORM-FACTOR PLUGGABLE MODULE

TECHNICAL FIELD

The present disclosure relates to an enhanced small form-factor pluggable (SFP+) transceiver module configured to send and receive data at enhanced data rates to a modified SFP+ host port.

BACKGROUND

Conventional enhanced small form-factor pluggable (SFP+) transceiver modules are pluggable modules that are designed for data transmissions in compliance with the ten gigabit Ethernet (10G) standard. 10G optical connectivity has emerged as a primary media choice for data center and local area network backbone applications. The emergence of cloud computing, virtualization, high definition video conferencing and other applications require increased port density and performance for these modules. Quad small-form factor pluggable (QSFP) modules provide up to three times higher faceplate 10G port density when compared to the SFP+ modules. QSFP modules, however, require an intermediate box to extend uplink port density. Currently QSFP modules are not technically feasible to support data communications at distances greater than ten kilometers. Furthermore, additional ports are not desirable for SFP+ modules since they reduce port density for corresponding faceplates.

BRIEF DESCRIPTION OF THE DRAWINGS

FIG. 4 is an example block diagram showing pin configurations for connector units of the conventional SFP+ transceiver module, modified SFP+ transceiver module and modified SFP+ host port.

DESCRIPTION OF EXAMPLE EMBODIMENTS

Overview

An enhanced small form-factor pluggable (SFP+) transceiver module and a new SFP+ host port are provided. The enhanced SFP+ transceiver module receives a reception data signal at a data rate of 40 Gigabits per second (40G). The reception data signal is sent to a transceiver bidirectional transmission unit. The transceiver bidirectional transmission unit comprises a first SFP+ connector unit configured to interface with a second SFP+ connector unit of an SFP+ host port. The reception data signal is sent from the transceiver bidirectional transmission unit to the second SFP+ connector unit of the SFP+ host port via the first SFP+ connector unit.

Additionally, the enhanced SFP+ host port receives a 40G transmission data signal. The transmission data signal is sent to a host bidirectional transmission unit across a plurality of transmission data channels. The host bidirectional transmission unit comprises a host SFP+ connector unit configured to interface with a transceiver SFP+ connector unit of an SFP+ transceiver module. The transmission data signal is sent from the host bidirectional transmission unit to the transceiver SFP+ connector unit of the SFP+ transceiver module via the host SFP+ connector unit.

Example Embodiments

Figure 1A:
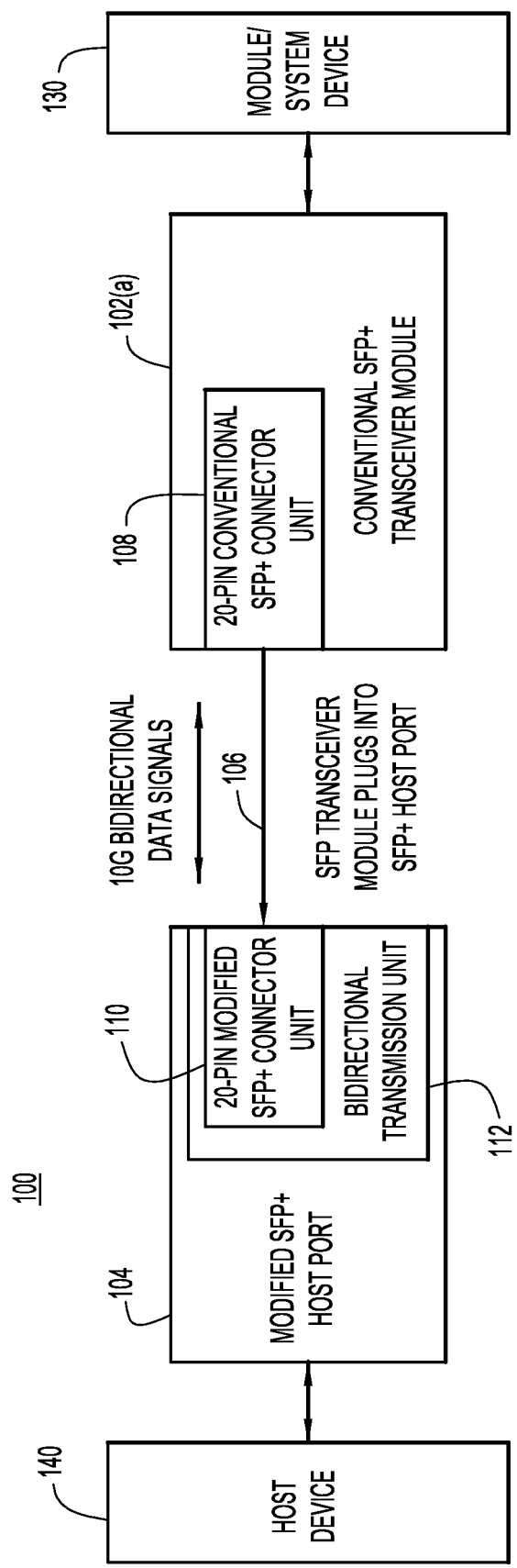
FIGS. 1A and 1B show an example topology depicting a conventional enhanced small form-factor pluggable (SFP+) transceiver module and a modified SFP+ transceiver module configured to interface with a modified SFP+ host port to send and receive data communications.
Figure 1B:
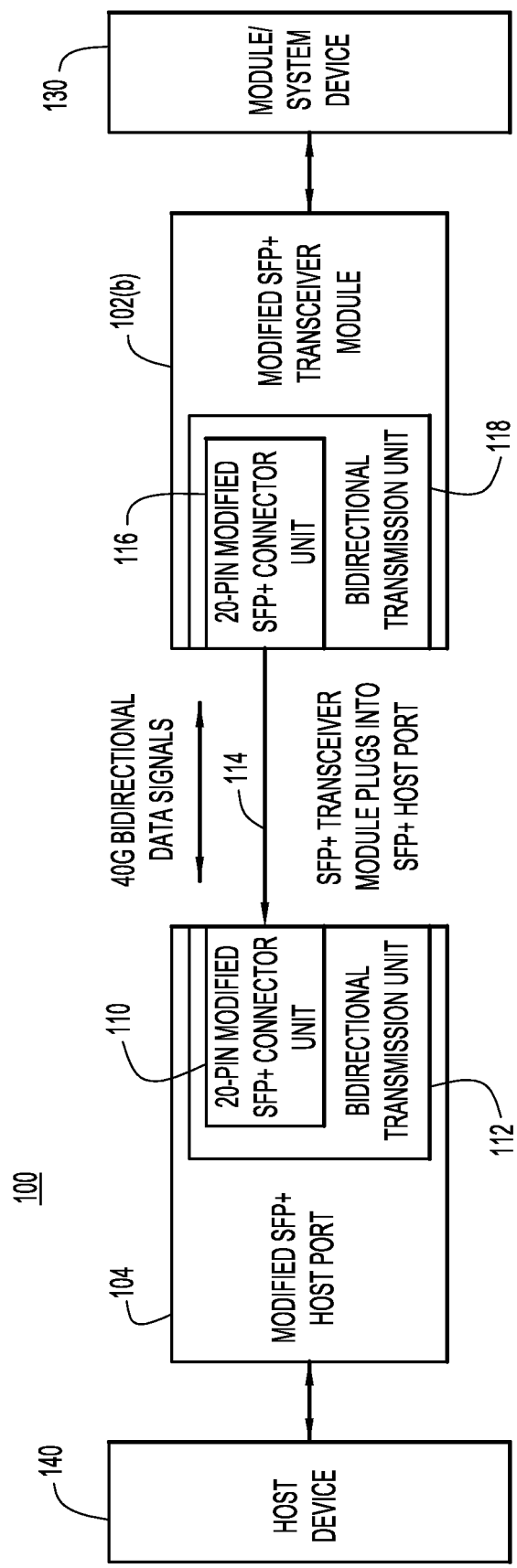

The techniques described herein are directed to sending and receiving enhanced data communications between a transceiver module and a host port. An example topology 100 is illustrated in FIGS. 1A and 1B. In FIG. 1A, the topology 100 has a conventional enhanced small form-factor pluggable (SFP+) transceiver module device (hereinafter "conventional SFP+ transceiver module," "conventional SFP+ transceiver" or "conventional SFP+ module"), which is shown at reference numeral 102(a). The topology 100 also has a modified SFP+ host port device (hereinafter "modified SFP+ host port"), which is shown at reference numeral 104. The conventional SFP+ transceiver module 102(a) is configured to plug into the modified SFP+ host port 104, as shown by the arrow in reference numeral 106. The conventional SFP+ transceiver module 102(a) has a connector unit 108 (referred to hereinafter as a "conventional transceiver SFP+ connector unit"), which may be a 20-pin conventional SFP+ connector unit. Similarly, the modified SFP+ host port 104 has a connector unit 110 (referred to hereinafter as a "modified host SFP+ connector unit"), which may be a 20-pin modified SFP+ connector unit. The modified host SFP+ connector unit 110 is located in a bidirectional transmission unit 112 (referred to hereinafter as a "host bidirectional transmission unit") of the modified SFP+ host port 104. The conventional transceiver SFP+ connector unit 108 and the modified host SFP+ connection unit 110 are described in more detail hereinafter.

As stated above, the conventional SFP+ transceiver module 102(a) is configured to be inserted or plugged into the modified SFP+ host port 104. When this occurs, pins on the conventional transceiver SFP+ connector unit 108 engage corresponding pins on the modified host SFP+ connector unit 110. Thus, data communications may be sent between the conventional SFP+ transceiver module 102(a) and the modified SFP+ host port 104. In particular, the conventional SFP+ transceiver module 102(a) is configured to send and receive data signals in compliance with the ten gigabit Ethernet standard (hereinafter "10G" or "10G data signals") to and from the modified SFP+ host port 104. Likewise, the modified SFP+ host port 104 is configured to send and receive 10G data signals to and from the conventional SFP+ transceiver module 102(a).

In one example, when the conventional SFP+ transceiver module 102(a) plugs into the modified SFP+ host port 104, 10G data signals may be sent from the conventional SFP+ transceiver module 102(a) to the modified SFP+ host port 104 (e.g., "10G module-to-host communications") and 10G data signals may be sent from the modified SFP+ host port 104 to the conventional SFP+ transceiver module 102(a) (e.g., "10G host-to-module communications"). Thus, the 10G data signals in separate Transmit (Tx) and Receive (Rx) paths may be sent between the conventional SFP+ transceiver module 102(*a*) and the modified SFP+ host port 104.

FIG. 1B shows the topology 100 having a modified SFP+ transceiver module device (hereinafter "modified SFP+ transceiver module," "modified SFP+ transceiver" or "modified SFP+ module"), shown at reference numeral 102(*b*). The modified SFP+ transceiver module 102(*b*) is configured to plug into the modified SFP+ host port 104, as shown by the arrow in reference numeral 114. The modified SFP+ transceiver module 102(*b*) has a connector unit 116 (referred to hereinafter as a "modified transceiver SFP+ connector unit"), which may be a 20-pin modified SFP+ connector unit. The modified transceiver SFP+ connector unit 116 is located in a bidirectional transmission unit 118 of the modified SFP+ transceiver module 102(*b*) (referred to hereinafter as a "transceiver bidirectional transmission unit").

FIG. 1B also shows the modified SFP+ host port 104. It should be appreciated that the modified SFP+ host port 104 in FIG. 1B is the same modified SFP+ host port 104 that is shown in FIG. 1A. As stated above, the modified SFP+ transceiver module 102(*b*) is configured to interface or plug into the modified SFP+ host port 104. When this happens, pins on the modified transceiver SFP+ connector unit 116 engage corresponding pins on the modified host SFP+ connector unit 110. Thus, data communications may be sent between the modified SFP+ transceiver module 102(*b*) and the modified SFP+ host port 104. In particular, the modified SFP+ transceiver module 102(*b*) is configured to send and receive data signals in compliance with the 40 Gigabit Ethernet standard (hereinafter "40G" or "40G data signals") to and from the modified SFP+ host port 104. Likewise, the modified SFP+ host port 104 is configured to send and receive 40G data signals to and from the modified SFP+ transceiver module 102(*b*).

For example, when the modified SFP+ transceiver module 102(*b*) plugs into the modified SFP+ host port 104, 40G data signals may be sent from the modified SFP+ transceiver module 102(*b*) to the modified SFP+ host port 104 (e.g., "40G module-to-host communications") and 40G data signals may be sent from the modified SFP+ host port 104 to the modified SFP+ transceiver module 102(*b*) (e.g., "40G host-to-module communications"). Thus, bidirectional 40G data signals in the form of 4×10 Gbps channels may be sent between the modified SFP+ transceiver module 102(*b*) and the modified SFP+ host port 104.

As shown in FIGS. 1A and 1B, the modified SFP+ host port 104 is configured to interface with both the conventional SFP+ transceiver module 102(*a*) and the modified SFP+ transceiver module 102(*b*) to perform respective 10G and 40G bidirectional data communications. The modified SFP+ host port 104 maintains compatibility with both conventional SFP+ transceiver modules (e.g., the conventional SFP+ transceiver module 102(*a*)) and modified SFP+ transceiver modules (e.g., the modified SFP+ transceiver module 102(*b*)). In other words, the modified SFP+ host port 104 is backward compatible with the conventional SFP+ transceiver modules to enable 10G data communications and is compatible (e.g., "forward compatible") with the modified SFP+ transceiver modules to enable 40G data communications.

FIGS. 1A and 1B also show a module/system device 130 configured to communicate with the conventional SFP+ transceiver module 102(*a*) and the modified SFP+ transceiver module 102(*b*). Additionally, a host device 140 is provided that is configured to communicate with the modified SFP+ host port 104. It should be appreciated that the module-to-host communications (e.g., 10G and 40G module-to-host communications) described herein may originate from the module/system device 130 and may be destined for the host device 140 and that the conventional SFP+ transceiver module 102(*a*), the modified SFP+ transceiver module 102(*b*) and the modified SFP+ host port 104 may operate as intermediate devices for these communications. Similarly for host-to-module communications (e.g., 10G and 40G host-to-module communications) described herein, communications may originate from the host device 140 and may be destined for the module/system device 130 and that the conventional SFP+ transceiver module 102(*a*), the modified SFP+ transceiver module 102(*b*) and the modified SFP+ host port 104 may operate as intermediate devices for these communications.

Figure 2:
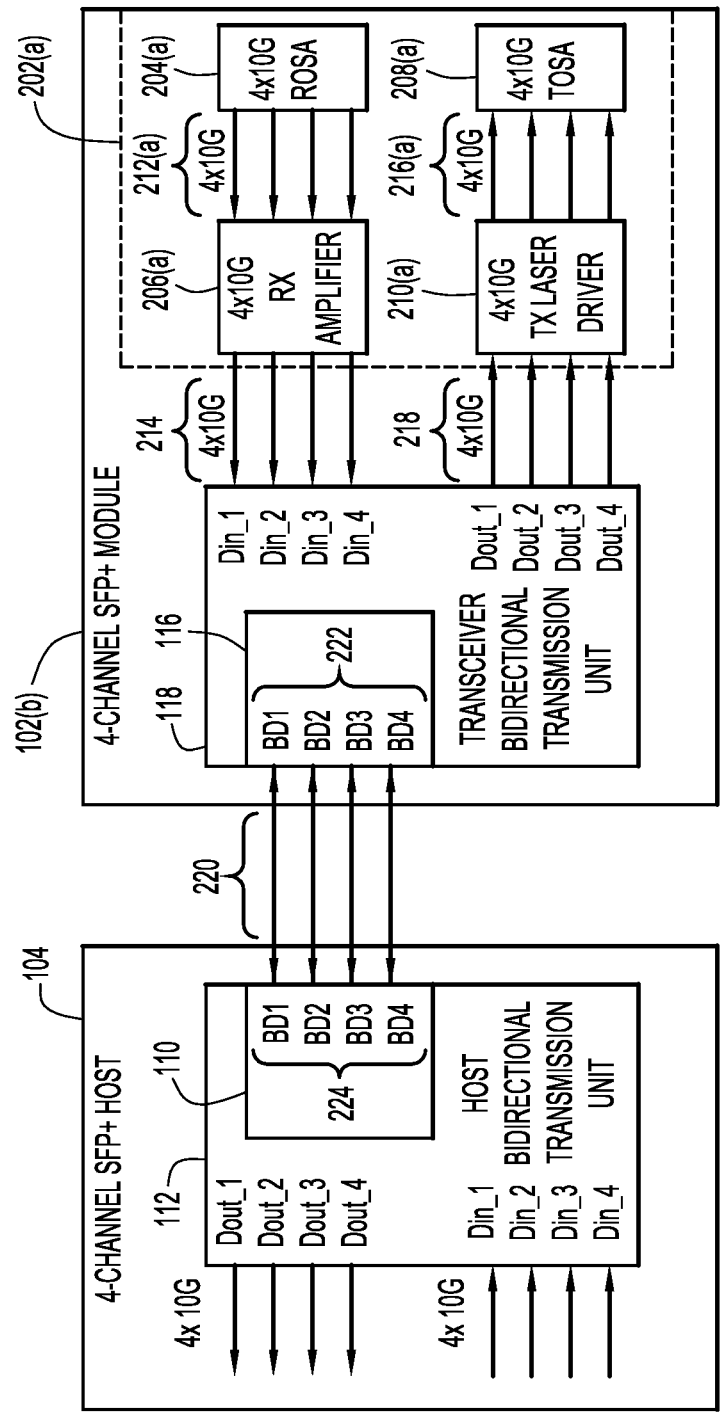
FIG. 2 is an example block diagram depicting components of the modified SFP+ transceiver module and the modified SFP+ host port to send and receive data communications across multiple 10G data signal paths.

Reference is now made to FIG. 2. FIG. 2 shows an example block diagram depicting components of the modified SFP+ transceiver module 102(*b*) and the modified SFP+ host port 104 to send and receive 40G data signals across multiple signal paths. The modified SFP+ transceiver module 102(*b*) has a transceiver unit 202(*a*) which comprises a receiver optical subassembly (ROSA) unit 204(*a*), a receiver amplifier unit 206(*a*), a transmitter optical subassembly (TOSA) unit 208(*a*) and a transmitter laser driver unit 210(*a*). The ROSA unit 204(*a*), the receiver amplifier unit 206(*a*), the TOSA unit 208(*a*) and the transmitter laser driver unit 210(*a*) are 4×10G units, meaning that each unit is configured to send and receive four 10G data signals across corresponding data channels configured to carry 10G data signals.

The ROSA unit 204(*a*) is electrically connected to the receiver amplifier unit 206(*a*) across a plurality of ROSA data channels, shown at reference numeral 212(*a*). The receiver amplifier unit 206(*a*) is electrically connected to the transceiver bidirectional transmission unit 118 across a plurality of reception data channels, shown at reference numeral 214. Similarly, the TOSA unit 208(*a*) is electrically connected to the transmitter laser driver unit 210(*a*) across a plurality of TOSA data channels, shown at reference numeral 216(*a*). The transmitter laser driver unit 210(*a*), is electrically connected to the transceiver bidirectional transmission unit 118 across a plurality of transmission data channels, shown at reference numeral 218.

The transceiver bidirectional transmission unit 118 has the modified transceiver SFP+ connector unit 116 which, as described above, is configured to interface with the modified host SFP+ connector unit 110 of the modified SFP+ host port 104. This enables bidirectional 40G data signals to be sent between the modified SFP+ transceiver module 102(*b*) and the modified SFP+ host port 104. The modified transceiver SFP+ connector unit 116 and the modified host SFP+ connector unit 110 are electrically connected to each other via a plurality of bidirectional data channels, shown at reference numeral 220.

As stated above, 40G module-to-host communications may be sent from the modified SFP+ transceiver module 102(*b*) to the modified SFP+ host port 104. In this example, the ROSA unit 204(*a*) of the modified SFP+ transceiver module 102(*b*) receives a 40G reception data signal, e.g., from a module/system device 130. The ROSA unit 204(*a*) may receive the 40G reception data signal comprising four 10G data signals from the module/system device 130. The ROSA unit 204(*a*) sends the 40G reception data signal (as four 10G data signals) to the receiver amplifier unit 206(*a*) across the ROSA data channels 212(*a*). For example, the ROSA data channels comprise four data links each configured to carry 10G data signals. The receiver amplifier unit 206(*a*) amplifies each of the four 10G data signals, if necessary, and sends the four 10G data signals to the transceiver bidirectional transmission unit 118 across the reception data channels 214 comprising, for example, four data links each configured to carry 10G data signals.

Upon receiving the 40G reception data signal (e.g., the four 10G data signals from the receiver amplifier unit 206(a)), the transceiver bidirectional transmission unit 118 sends the 40G reception data signal from the modified transceiver SFP+ connector unit 116 to the modified host SFP+ connector unit 110 across the bidirectional data channels 220. For example, transceiver bidirectional transmission unit 118 sends the 40G reception data signal across four signal pin pairs of the modified transceiver SFP+ connector unit 116, each of which is configured to send and receive bidirectional data communications (e.g., bidirectional 10G data signals). These four signal pin pairs of the modified transceiver SFP+ connector unit 116 are shown at reference numeral 222 as "BD1," "BD2," "BD3," and "BD4" and are described in detail hereinafter. The modified host SFP+ connector unit 110 receives the 40G reception data signal, for example, at corresponding four signal pin pairs of the modified host SFP+ connector unit 110, shown at reference numeral 224. Upon receiving the 40G reception data signals from the modified transceiver SFP+ connector unit 116, the modified SFP+ host port 104 sends the 40G reception data signals to appropriate host device 140 electrically connected to the modified SFP+ host port 104. Thus, 40G data signals can be sent (e.g., as four 10G data signals) from the modified SFP+ transceiver module 102(b) to the modified SFP+ host port 104. In other words, the modified SFP+ transceiver module 102(b) operates as a high density four-channel SFP+ transceiver module to support 40G data signals.

Also, as stated above, 40G host-to-module communications may be sent from the modified SFP+ host port 104 to the modified SFP+ transceiver module 102(b). In this example, the modified SFP+ host port 104 receives a 40G transmission data signal, e.g., from a host device 140. The 40G transmission data signal is sent to the host bidirectional transceiver unit 112 of the modified SFP+ host port 104 (across, for example, four 10G data links). The modified host SFP+ connector unit 110 sends the 40G transmission signal to the modified transceiver SFP+ connector unit 116 of the transceiver bidirectional transmission unit 118 across the four bidirectional data channels 220. As stated above in connection with the 40G module-to-host communications, the modified host SFP+ connector unit 110 comprises the four signal pin pairs 224, each of which is configured to send and receive bidirectional data communications (e.g., bidirectional 10G data signals) to corresponding ones of the four signal pin pairs 222 of the modified transceiver SFP+ connector unit 116.

Upon receiving the 40G transmission data signal, the transceiver bidirectional transmission unit 118 sends the 40G transmission data signal (e.g., as four 10G data signals across four data links) to the transmitter laser driver unit 210(a) across the transmission data channels 218. The transmitter laser driver unit 210(a) then sends the four 10G data signals to the TOSA unit 208(a) across the TOSA data channels 216(a). Upon receiving the 40G transmission data signal (e.g., the four 10G data signals received from the transmitter laser driver unit 210(a)), the TOSA unit 208(a) sends the 40G transmission data signal to an appropriate module/system device 130 (not shown). Thus, 40G data signals can be sent from the modified SFP+ host port 104 to the modified SFP+ transceiver module 102(b). In other words, the modified SFP+ host port 104 operates as a high density four-channel SFP+ host port to support 40G data signals.

Figure 3:
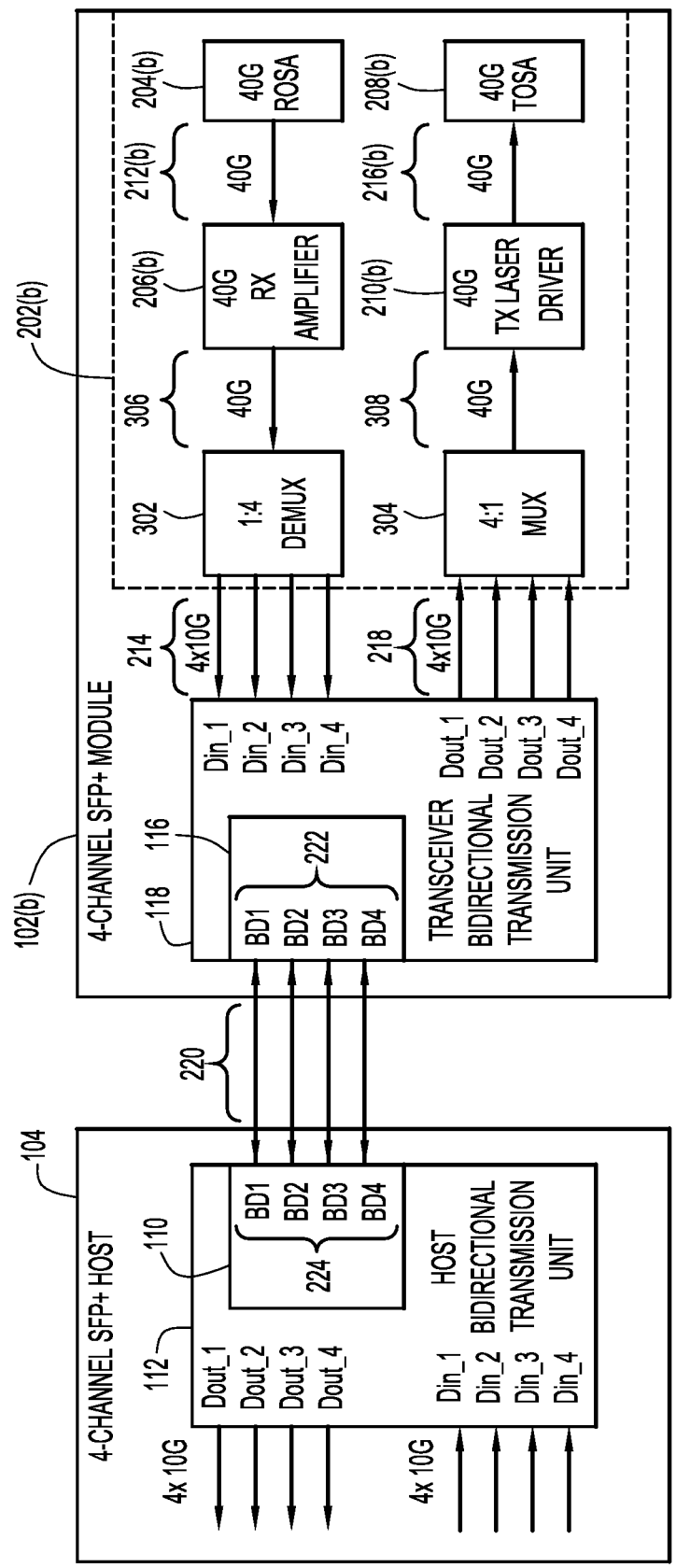
FIG. 3 is an example block diagram depicting components of the modified SFP+ transceiver module and the modified SFP+ host port to send and receive serial 40G optical data.

Reference is now made to FIG. 3, which shows an alternative block diagram of components of the modified SFP+ transceiver module 102(b) and the modified SFP+ host port 104 to send and receive serial optical 40G data signal. The modified SFP+ transceiver module 102(b) has a transceiver unit 202(b) which comprises a ROSA unit 204(b), a receiver amplifier unit 206(b), a TOSA unit 208(b) and a transmitter laser driver 210(b). These components of the modified SFP+ transceiver module 102(b) operate similarly to components described in connection with FIG. 2, above. However, the ROSA unit 204(b), the receive amplifier unit 206(b), the TOSA unit 208(b) and the transmitter laser driver 210(b) are 40G units, meaning that each of these units is configured to send and receive one 40G data signal across corresponding single data channels, each of which is configured to carry 40G data signals. The SFP+ transceiver unit 102(b) in FIG. 3 also comprises a demultiplexing unit 302 and a multiplexing unit 304, which is not shown in the depiction of the modified SFP+ transceiver unit 102(b) in FIG. 2, above. Additionally, the modified SFP+ transceiver unit 102(b) in FIG. 3 comprises the transceiver bidirectional transmission unit 118, which is the same as described in FIG. 2, above.

The ROSA unit 204(b) is electrically connected to the receiver amplifier unit 206(b) across a ROSA data channel, shown at reference numeral 212(b). The receiver amplifier unit 206(b) is electrically connected to the demultiplexing unit 302 across a demultiplexing data channel, shown at reference numeral 306. The demultiplexing unit 302 is electrically connected to the transceiver bidirectional transmission unit 118 across the plurality of reception data channels 214. Similarly, the TOSA unit 208(b) is electrically connected to the transmitter laser driver unit 210(b) across a TOSA data channel, shown at reference numeral 216(b). The transmitter laser driver unit 210(b) is electrically connected to the multiplexing unit across a multiplexing data channel, shown at reference numeral 308. The multiplexing unit 304 is electrically connected to the transceiver bidirectional transmission unit 118 across the plurality of transmission data channels 218.

It should be appreciated that the ROSA data channel 212(b), the TOSA data channel 216(b), the demultiplexing data channel 306 and the multiplexing data channel 308 are configured to carry serial optical 40G data across a single link. It should also be appreciated that the reception data channels 214 and the transmission data channels 218 are the same data channels as those described in FIG. 2 above, each of which is configured to carry 10G data signals.

For 40G module-to-host communications between the modified SFP+ transceiver module 102(b) in FIG. 3 and the modified SFP+ host port 104, the ROSA unit 204(b) of the modified SFP+ transceiver module 102(b) receives a 40G reception data signal from the module/system device 130. The ROSA unit 204(b) sends the 40G reception data signal to the receiver amplifier unit 206(b) across the ROSA data channel 212(b). The receiver amplifier unit 206(b) amplifies the 40G reception data signal, if necessary, and sends the 40G reception data signal to the demultiplexing unit 302 across the demultiplexing data channel 306. The demultiplexing unit 302 is a one to four (e.g., 1:4) demultiplexing unit that demultiplexes the single 40G reception data signal into four 10G data signals and sends these 10G data signals to the transceiver bidirectional transmission unit 118 across the reception data channels 214. The transceiver bidirectional transmission unit 118 then sends the four 10G data signals to the SFP+ host port 104 across the bidirectional data channels 220 in a similar manner as described in connection with FIG. 2, above. Thus, serial optical 40G data signals can be sent from the modified SFP+ transceiver module 102(b) to the modified SFP+ host port 104.

For 40G host-to-module communications, the modified SFP+ host port 104 receives a 40G transmission data signal from a host device 140 (e.g., across four 10G data links) and sends the 40G transmission data signal to the modified SFP+ transceiver module 102(b) across the bidirectional data channels 220 in a similar manner as described in connection with FIG. 2, above. Upon receiving the 40G transmission data signal, the transceiver bidirectional transmission unit 118 of the modified SFP+ host port 102(b) in FIG. 3 sends the 40G transmission data signal (as four 10G data signals) to the multiplexing unit 304 across the transmission data channels 218. The multiplexing unit 304 is a four to one (e.g., 4:1) multiplexing unit that multiplexes the four 10G data signals to a single or serial optical 40G transmission data signal. The serial optical 40G transmission data signal is then sent from the multiplexing unit 304 to the transmitter laser driver 210(b) across the multiplexing data channel 308. The transmitter laser driver 210(b) sends the 40G transmission data signal to the TOSA unit 208(b) across the TOSA data channel 216(b). Upon receiving the 40G transmission data signal, the TOSA unit 208(b) sends the 40G transmission data signal to the appropriate network device (not shown). Thus, serial optical 40G data can be sent from the modified SFP+ host port 104 to the modified SFP+ transceiver module 102(b).

Reference is now made to FIG. 4, which shows an example pin configuration for the conventional transceiver SFP+ connector unit 108, the modified host SFP+ connector unit 110 and the modified transceiver SFP+ connector unit 116. As shown in FIG. 4 and described above, each of these connector units has, for example, 20 pins. When the conventional SFP+ transceiver module 102(a) plugs into the modified SFP+ host port 104 (e.g., "conventional-to-modified example"), the pins on the conventional transceiver SFP+ connector unit 108 engage corresponding pins on the modified host SFP+ connector unit 110 to enable bidirectional 10G data signal communications. Likewise, when the modified SFP+ transceiver module 102(b) plugs into the modified SFP+ host port 104 (e.g., "modified-to-modified example"), the pins on the modified transceiver SFP+ connector unit 116 engage corresponding pins on the modified host SFP+ connector unit 110 to enable bidirectional 40G data signal communications. Thus, the pin configuration of the modified host SFP+ connector unit 110 enables the modified SFP+ host port 104 to be compatible with the conventional SFP+ transceiver module 102(a) and also with the modified SFP+ transceiver module 102(b). The conventional-to-modified example is described below, followed by the modified-to-modified example. It should be appreciated that the pin ordering shown in FIG. 4 is used simply as an example.

Conventional-to-Modified Example

As shown in FIG. 4, the conventional transceiver SFP+ connector unit 108 has two signal pin pairs: a first unidirectional signal pin pair at pins 12 and 13 (e.g., "RD pin pair") and a second unidirectional signal pin pair at pins 18 and 19 (e.g., "TD pin pair"). Likewise, the modified host SFP+ connector unit 110 has four signal pin pairs: a first bidirectional pin pair at pins 18 and 19 (e.g., "BD1 pin pair"); a second bidirectional pin pair at pins 15 and 16 (e.g., "BD2 pin pair"); a third bidirectional pin pair at pins 12 and 13 (e.g., "BD3 pin pair"); and a fourth bidirectional pin pair at pins 8 and 9 (e.g., "BD4 pin pair").

When the conventional transceiver SFP+ connector unit 108 interfaces with the modified host SFP+ connector unit 110, the RD pin pair of the conventional transceiver SFP+ connector unit 108 engages the BD3 pin pair of the modified host SFP+ connector unit 110. This, for example, enables unidirectional 10G module-to-host communications to be transmitted from the conventional SFP+ transceiver module 102(a) to the modified SFP+ host port 104 via pins 12 and 13. Also, the TD pin pair of the conventional transceiver SFP+ connector unit 108 engages the BD1 pin pair of the modified host SFP+ connector unit 110. This, for example, enables unidirectional 10G module-to-host communications to be transmitted from the modified host SFP+ host port 104 to the SFP+ transceiver module 102(a) via pins 18 and 19. Thus, the combination of the unidirectional 10G module-to-host communications and the unidirectional 10G host-to-module communications results in bidirectional 10G communications to be performed between the conventional SFP+ transceiver module 102(a) and the modified SFP+ host port 104.

The remaining pins on the conventional transceiver SFP+ connector unit 108 engage corresponding pins on the modified host SFP+ connector unit 110 to allow for proper signal exchange (e.g., control signals) between the conventional SFP+ transceiver module 102(a) and the modified SFP+ host port 104. It should be appreciated that the BD2 pin pair of the modified host SFP+ connector unit 110 also operates as a power supply pin pair. In other words, the pins assigned to the BD2 pin pair (pins 15 and 16) act as shared pins for power supply signals, and data signals and power supply signals may be delivered, concurrently or independently, via this pin pair. It should also be appreciated that in the conventional-to-modified example, bidirectional 10G communications are performed between the conventional SFP+ transceiver module 102(a) and the modified SFP+ host port 104 as a result of the unilateral host-to-module and module-to-host 10G data communications.

Modified-to-Modified Example

As shown in FIG. 4, the modified transceiver SFP+ connector unit 116 also has the BD1, BD2, BD3 and BD4 pin pairs in the same pin configuration as the modified host SFP+ connector unit 110. Thus, when the modified transceiver SFP+ connector unit 116 interfaces with the modified host SFP+ connector unit 110, the bidirectional signal pin pairs on each unit engage each other. This, for example, enables four bidirectional 10G host-to-module and module-to-host communications (e.g., one 10G bidirectional communication across each bidirectional signal pin pair), resulting 40G host-to-module and module-to-host communications between the modified SFP+ transceiver device 102(b) and the modified SFP+ host port 104. In other words, each of the bidirectional signal pin pairs are configured to receive 10G module-to-host and 10G host-to-module communications between the modified SFP+ transceiver module 102(b) and the modified SFP+ host port 104, resulting in bidirectional 10G communications across each bidirectional signal pin pair. As described above in the conventional-to-modified example, it should be appreciated one of the bidirectional pin pairs (e.g., the BD2 pin pair) acts as shared pins for a power supply pin pair. The remaining pins on the modified transceiver SFP+ connector unit 116 engage corresponding pins on the modified host SFP+ connector unit 110 to allow for proper signal exchange (e.g., control signals) between the conventional SFP+ transceiver module 102(a) and the modified SFP+ host port 104.

Figure 5:
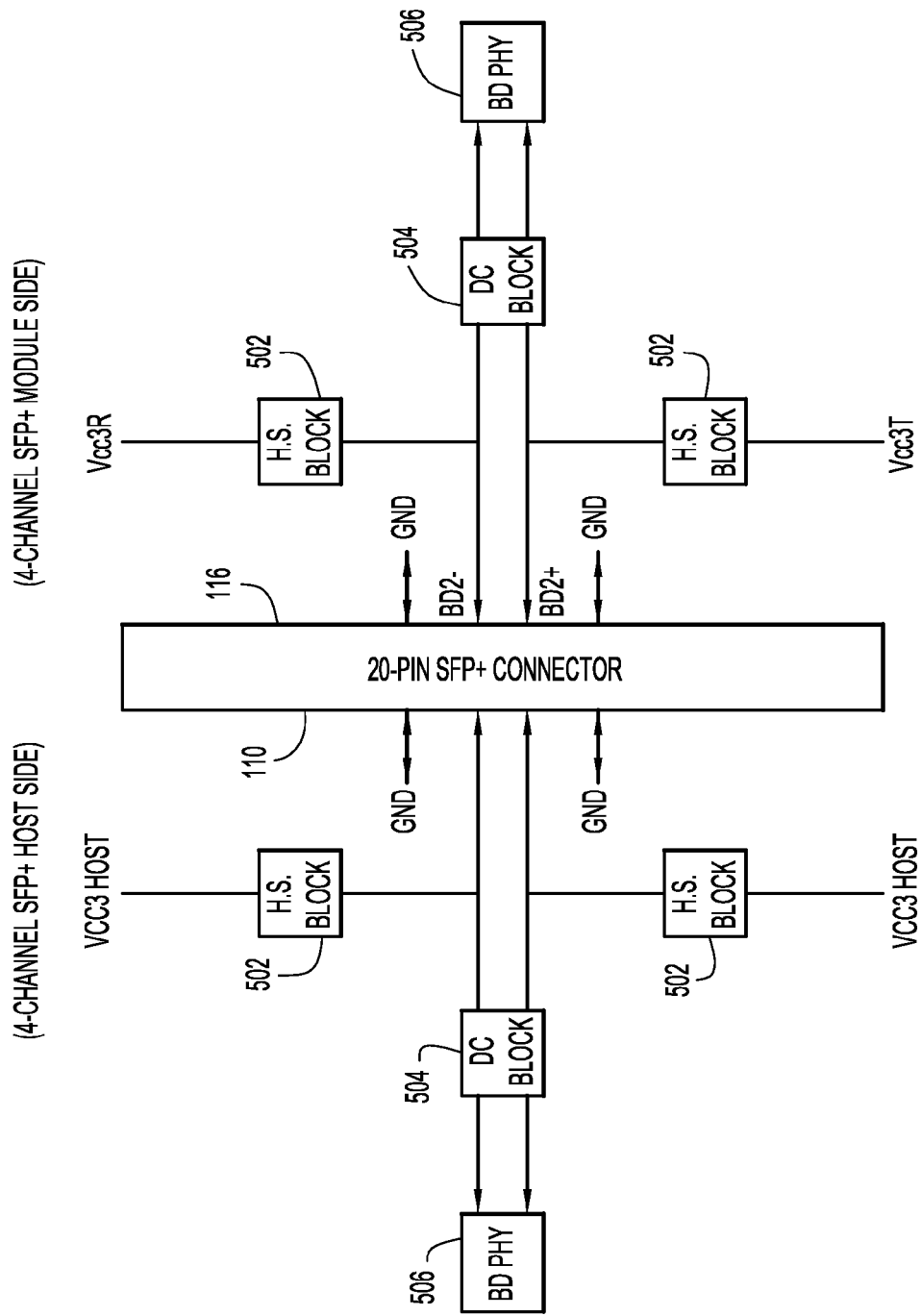
FIG. 5 is an example topology showing bidirectional data communications and power delivery via shared pin pairs.

Reference is now made to FIG. 5, which shows an example topology depicting shared bidirectional communications and power delivery between the modified SFP+ transceiver module 102(b) and the modified SFP+ host port 104. FIG. 5 shows the modified host SFP+ connector unit 110, the modified transceiver SFP+ connector unit 116, a plurality of high speed block units 502, a plurality of DC block units 504, a transceiver bidirectional physical layer (PHY) unit 504 and a host bidirectional PHY unit 506. Bidirectional data communications are sent from the transceiver bidirectional PHY unit 504 to the host bidirectional PHY unit 506 via the connector units 110 and 116. For high speed data communications between the transceiver bidirectional PHY unit 504 and the host bidirectional PHY unit 506, the DC block units 502 prevent power supply signals from being delivered to the PHY units 504 and 506 while allowing 10G traffic between the PHY units 504 and 506. At the same time, the high speed block units 502 prevent 10G traffic from the PHY units 504 and 506 to VCC3 (VCC3T, VCC3R, VCC3 Host) while allowing for VCC3 DC power supply to be delivered from VCC3 Host to VCC3T and VCC3R. In one example, the power supply signals are 3.3V signals that are delivered to the PHY units 504 and 506. The high speed block enables the same pin to be shared for both high speed data path as well as 3.3V signal source to the module (hence, dual function pins).

Figure 6:
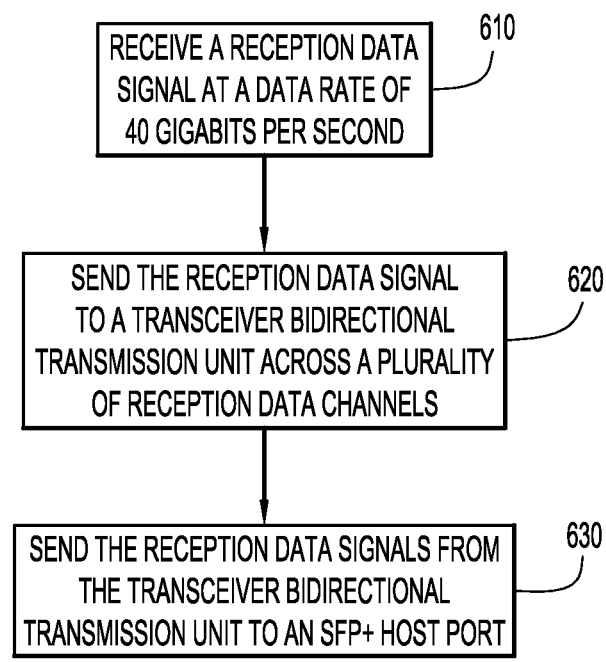
FIG. 6 is an example flow chart for module-to-host data communications between the modified SFP+ transceiver module and the modified SFP+ host port.

Reference is now made to FIG. 6, which shows an example flow chart depicting module-to-host data communications between the modified SFP+ transceiver module 102(b) and the modified SFP+ host port 104. At operation 610, a SFP+ transceiver module (e.g., the modified SFP+ transceiver module 102(b)) receives a 40G reception data signal, e.g., from a device coupled to the modified SFP+ transceiver module. At operation 620, the reception data signal is sent to the transceiver bidirectional transmission unit 118 across the plurality of reception data channels 214. The transceiver bidirectional transmission unit 118 comprises a first SFP+ connector unit (e.g., the modified transceiver SFP+ connector unit 116) configured to interface with a second SFP+ connector unit (e.g., the modified host SFP+ connector unit 110) of an SFP+ host port (e.g., the modified SFP+ host port 104). At operation 630, the reception data signal is sent from the transceiver bidirectional transmission unit to the modified host SFP+ connector unit 110 of the modified SFP+ host port 104 via the modified transceiver SFP+ connector unit 116.

Figure 7:
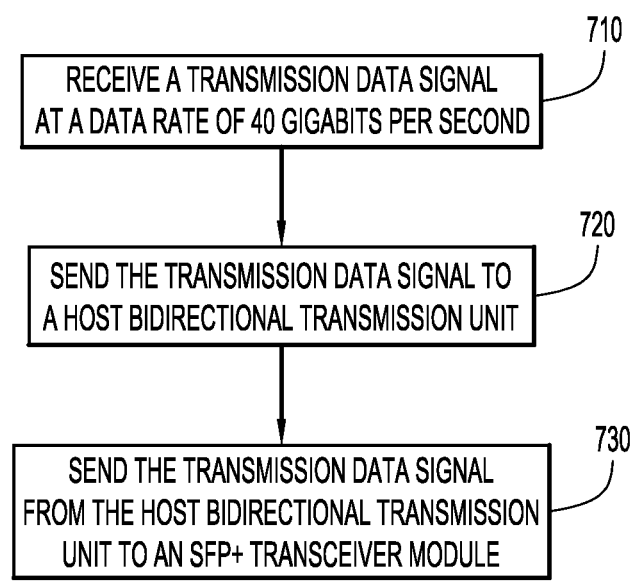
FIG. 7 is an example flow chart for host-to-module data communications between the modified SFP+ host port and the modified SFP+ transceiver module.

Reference is now made to FIG. 7, which shows an example flow chart depicting host-to-module data communications between the modified SFP+ host port 104 and the modified SFP+ transceiver module 102(b). At operation 710, an SFP+ host port (e.g., the modified SFP+ host port 104) receives a 40G transmission data signal, e.g., from a device coupled to the modified SFP+ host port 104. At operation 720, the transmission data signal is sent to the host bidirectional transmission unit 112 of the modified host SFP+ port 104 across the data channels. The host bidirectional transmission unit 112 comprises a host SFP+ connector unit (e.g., the modified host SFP+ connector unit 110) configured to interface with a transceiver SFP+ connector unit (e.g., the modified transceiver SFP+ connector unit 116) of an SFP+ transceiver module (e.g., the modified SFP+ transceiver module 102(b)). At operation 730, the transmission data signal is sent from the host bidirectional transmission unit to the modified transceiver SFP+ connector unit 116 of the modified SFP+ transceiver module 102(b).

It should be appreciated that the techniques described above in connection with all embodiments may be performed by one or more computer readable storage media that is encoded with software comprising computer executable instructions to perform the methods and steps described herein. For example, the operations performed by the conventional SFP+ transceiver module 102(a), the modified SFP+ transceiver module 102(b) and the modified SFP+ host port 104 may be performed by one or more computer or machine readable storage media or device executed by a processor and comprising software, hardware or a combination of software and hardware to perform the techniques described herein.

In sum, a method is provided comprising: at an enhanced small form-factor pluggable (SFP+) transceiver module, receiving a reception data signal at a data rate of 40 gigabits per second (40G); sending the reception data signal to a transceiver bidirectional transmission unit across a plurality of reception data channels, wherein the transceiver bidirectional transmission unit comprises a first SFP+ connector unit configured to interface with a second SFP+ connector unit of an SFP+ host port; and sending the reception data signal from the transceiver bidirectional transmission unit to the second SFP+ connector unit of the SFP+ host port via the first SFP+ connector unit.

In addition, a method is provided comprising: at an enhanced small form-factor pluggable (SFP+) host port, receiving a transmission data signal at a data rate of 40 Gigabits per second (40G); sending the transmission data signal to a host bidirectional transmission unit across a plurality of transmission data channels, wherein the host bidirectional transmission unit comprises a host SFP+ connector unit configured to interface with a transceiver SFP+ connector unit of an SFP+ transceiver module; and sending the transmission data signal from the host bidirectional transmission unit to the transceiver SFP+ connector unit of the SFP+ transceiver module via the host SFP+ connector unit.

Furthermore, an apparatus is provided comprising: a receiver optical subassembly (ROSA) unit configured to receive a reception data signal at a data rate of 40 Gigabits per second (40G); and a transceiver bidirectional transmission unit comprising a first SFP+ connector unit configured to interface with a second SFP+ connector unit of an SFP+ host port, wherein the transceiver bidirectional transmission unit receives the reception data signal from the ROSA unit and sends the reception data signal to the second SFP+ connector unit of the SFP+ host port via the first SFP+ connector unit.

Additionally, an apparatus is provided comprising a host bidirectional transmission unit comprising a host SFP+ connector unit that interfaces with a transceiver SFP+ connector unit of an SFP+ transceiver module, wherein the host bidirectional transmission unit is configured to receive a transmission data signal at a data rate of forty gigabits per second (40G) and send the transmission data signal to the transceiver SFP+ connector unit via the host SFP+ connector unit.

The above description is intended by way of example only. Various modifications and structural changes may be made therein without departing from the scope of the concepts described herein and within the scope and range of equivalents of the claims.

What is claimed is:
1. A method comprising:
   at an enhanced small form-factor pluggable (SFP+) transceiver module, receiving a reception data signal at a data rate of 40 gigabits per second (40G);
   sending the reception data signal to a transceiver bidirectional transmission unit across a plurality of reception data channels, wherein the transceiver bidirectional transmission unit comprises a first SFP+ connector unit configured to interface with a second SFP+ connector unit of an SFP+ host port;
   sending the reception data signal from the transceiver bidirectional transmission unit to the second SFP+ connector unit of the SFP+ host port via the first SFP+ connector unit; and
   configuring a pair of signal pins on the first SFP+ connector unit to operate as shared power supply pins and signal transmission pins to enable transmission of the reception data signal to the SFP+ host port.

2. The method of claim 1, wherein sending the reception data signal to the transceiver bidirectional transmission unit comprises sending the reception data signal to the transceiver bidirectional transmission unit across four data channels, wherein each of the four data channels is configured to carry data signals at a data rate of ten gigabits per second (10G).

3. The method of claim 1, wherein sending the reception data signal to the transceiver bidirectional transmission unit comprises sending the reception data signal to the transceiver bidirectional transmission unit as serial data at the 40G data rate.

4. A method comprising:
at an enhanced small form-factor pluggable (SFP+) host port, receiving a transmission data signal at a data rate of 40 gigabits per second (40G);
sending the transmission data signal to a host bidirectional transmission unit across a plurality of transmission data channels, wherein the host bidirectional transmission unit comprises a host SFP+ connector unit configured to interface with a transceiver SFP+ connector unit of an SFP+ transceiver module;
sending the transmission data signal from the host bidirectional transmission unit to the transceiver SFP+ connector unit of the SFP+ transceiver module via the host SFP+ connector unit; and
configuring a pair of signal pins on the host SFP+ connector unit to operate as shared power supply pins and signal transmission pins to enable transmission of the transmission data signal to the transceiver SFP+ connector unit.

5. The method of claim 4, wherein sending the transmission data signal to the host transceiver bidirectional transmission unit comprises sending the transmission data signal to the host bidirectional transmission unit across four data channels, wherein each of the four data channels is configured to carry data signals at a data rate of ten gigabits per second (10G).

6. The method of claim 4, wherein sending the transmission data signal to the host transceiver bidirectional transmission unit comprises sending the transmission data signal to the host bidirectional transmission unit as serial data at the 40G data rate.

7. An apparatus comprising:
a receiver optical subassembly (ROSA) unit configured to receive a reception data signal at a data rate of forty gigabits per second (40G); and
a transceiver bidirectional transmission unit comprising a first SFP+ connector unit configured to interface with a second SFP+ connector unit of an SFP+ host port, wherein the first SFP+ connector unit comprises a pair of signal pins configured to operate as shared power supply pins and signal transmission pins to enable transmission of the reception data signal to the SFP+ host port and wherein the transceiver bidirectional transmission unit receives the reception data signal from the ROSA unit and sends the reception data signal to the second SFP+ connector unit of the SFP+ host port via the first SFP+ connector unit.

8. The apparatus of claim 7, wherein the transceiver bidirectional transmission unit is configured to receive the reception data signal from the ROSA unit across four data channels, wherein each of the four data channels is configured to carry data signals at a data rate of ten gigabits per second (10G).

9. The apparatus of claim 7, wherein the module bidirectional transmission unit is configured to receive the reception data signals from the ROSA unit as serial data at the 40G data rate.

10. The apparatus of claim 7, further comprising a transceiver optical subassembly (TOSA) unit configured to receive a transmission signal from the bidirectional transmission unit, wherein the transmission signal is a 40G data signal originating from the SFP+ host port.

11. The apparatus of claim 10, wherein the TOSA unit is configured to receive the transmission signal across four data channels, wherein each of the four data channels is configured to carry data signals at a data rate of ten gigabits per second (10G).

12. The apparatus of claim 7, further comprising:
a multiplexer device configured to receive the transmission data signal across four data channels from the module bidirectional transmission unit, aggregate the transmission data signal into one serial 40G data signal and transmit the transmission data signal to the TOSA unit; and
a demultiplexer device configured to receive the reception data signal across a data channel from the ROSA unit, split the reception data signal into four reception data signals each having a data rate of ten gigabits per second (10G) and transmit the reception data signals to the module bidirectional transmission unit.

13. An apparatus comprising a host bidirectional transmission unit comprising a host SFP+ connector unit that interfaces with a transceiver SFP+ connector unit of an SFP+ transceiver module, wherein the host SFP+ connector unit comprises a pair of signal pins to operate as shared power supply pins and signal transmission pins to enable transmission of the transmission data signal to the transceiver SFP+ connector unit and wherein the host bidirectional transmission unit is configured to receive a transmission data signal at a data rate of forty gigabits per second (40G) and send the transmission data signal to the transceiver SFP+ connector unit via the host SFP+ connector unit.

14. The apparatus of claim 13, wherein the host bidirectional transmission unit is configured to receive the transmission data signal across four data channels, each of which is configured to carry data signals at a data rate of ten gigabits per second (10G).

15. The apparatus of claim 13, wherein the host bidirectional transmission unit is configured to receive the transmission data as serial data at the 40G data rate.

* * * * *